Feb. 11, 1941.  L. R. LUDWIG ET AL  2,231,503
TROLLEY CONTROL SYSTEM
Filed Feb. 21, 1940  3 Sheets-Sheet 1

Contacts 33 & 34 actuated in accordance with movement of track switches

WITNESSES:
E. A. M<sup>c</sup>Closkey
E. J. Roberts

INVENTORS
Leon R. Ludwig and
Edwin L. Harder.
BY
J. M. Crawford
ATTORNEY

Feb. 11, 1941.                L. R. LUDWIG ET AL                2,231,503
                              TROLLEY CONTROL SYSTEM
                              Filed Feb. 21, 1940          3 Sheets-Sheet 2

WITNESSES:                                    INVENTORS
E. A. McCloskey                         Leon R. Ludwig and
E. J. Roberts                              Edwin L. Harder.
                                        BY G. J. Crawford
                                              ATTORNEY

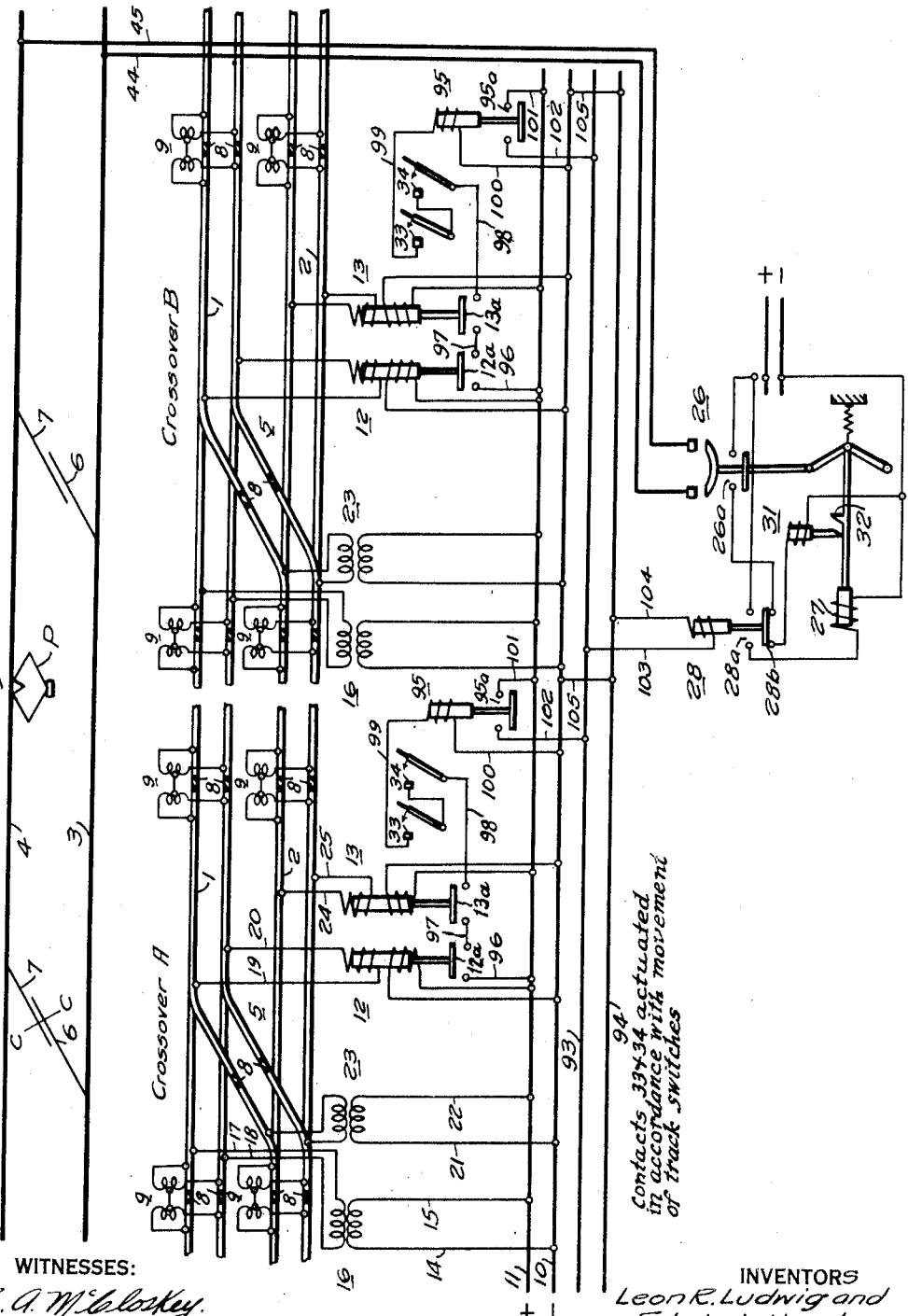

UNITED STATES PATENT OFFICE 2,231,503

TROLLEY CONTROL SYSTEM

Leon R. Ludwig and Edwin L. Harder, Forest Hills, Pa., assignors to Westinghouse Electric & Manufacturing Company, East Pittsburgh, Pa., a corporation of Pennsylvania Application February 21, 1940, Serial No. 320,110

19 Claims. (Cl. 191—2)

Our invention relates, in general, to control systems, and has particular reference to control systems for railway trolley systems.

It is common practice in electric railway trolley systems, to provide separate trolleys for each of the tracks on the right-of-way, all of the trolleys being bussed together at spaced sub-stations of the order of fifteen or more miles apart, where power is fed into the trolley system. One reason for this is that in the event a fault occurs on one trolley, only that particular trolley will be disconnected from the line and train operation on the other tracks will not be interrupted.

The voltage at any point on any trolley between sub-stations depends upon the instantaneous power demand from that particular trolley. That is, as the demand for current increases or decreases, the voltage drop along the trolley will also be proportionately increased or decreased, respectively. Under operating conditions, the differential in track loading is often such as to produce marked differential in voltage between adjacent trolleys. Where crossovers between tracks are installed, such voltage differential may cause an arc to be established between the overlapped portions of the stub trolleys which feed the crossover, when the current collecting device of the locomotive or train makes the changeover from one to the other of the stub trolleys. The tendency of such arcing to occur is increased as the operating potential of the trolley system is increased. Any arc which is "pulled" between trolley stubs will, of course, be continued so long as the voltage differential is sufficiently high to supply the voltage necessary to maintain it, and will obviously cause damage to both the trolley and its supporting structure.

Another matter of importance in trolley systems of this kind, is that of maintaining a sufficient voltage to all points along all of the trolleys between sub-stations so that locomotive equipment may be satisfactorily operated under all conditions of track loading. Adequate trolley voltage can be maintained by spacing the sub-stations, at which the trolleys are bussed, at close intervals, or by increasing the size of the trolley conductors themselves. However, either alternative would greatly increase the installation costs of new electrified lines, and lines already established could thus be modified only at enormous expense.

It is one object of our invention to provide a control system for trolleys in which adjacent trolleys are tied in parallel while a train is passing along a crossover between the trolleys to eliminate arcing between the stub trolleys feeding the crossover and to thereafter break the parallel connection upon the completion of the crossover.

Another object of our invention is to improve the voltage regulation of a plurality of trolleys by providing control apparatus which functions to tie any two or more of the trolleys in parallel while the voltage differential between the trolleys exceeds a preselected maximum.

Still another object of our invention is to provide a control system for placing adjacent trolleys in parallel when a train is passing from one to the other of the tracks fed by such trolleys, or while the differential in voltage between such trolleys exceeds a preselected maximum.

A more specific object of our invention is to provide a system of control for paralleling adjacent trolleys when a train crossover between the trolleys is being effected, in which track relays actuated by train movement are interlocked with the track crossover switch operating means to control the operation of the trolley tie breaker.

A further object of our invention is to provide a control system for paralleling adjacent trolleys when the voltage differential exceeds a preselected maximum for a predetermined time interval or when the voltage of any trolley has been reduced below a preselected minimum.

Another object of our invention is to provide a control system which will parallel adjacent trolleys when the voltage differential has exceeded a preselected maximum for a predetermined time but which will not place the trolleys in parallel operation while one of the trolleys is disconnected from the trolley power supply system.

A still further object of our invention is to provide a system of control for placing adjacent trolleys in parallel operation in which a single trolley tie breaker is actuated to a closed position when the current collecting device of a locomotive makes a changeover from one of the trolleys to the other at any one of a plurality of crossover points.

Another object of our invention is to provide a control system for improving the voltage regulation of a plurality of trolleys in which any two or more of the trolleys are placed in parallel operation while the voltage differential between the trolleys exceeds a preselected maximum or while the absolute voltage of any of the trolleys has been reduced below a preselected minimum value.

These and other objects of our invention will be brought out in the following detailed description when considered with the drawings in which.

Figure 4:
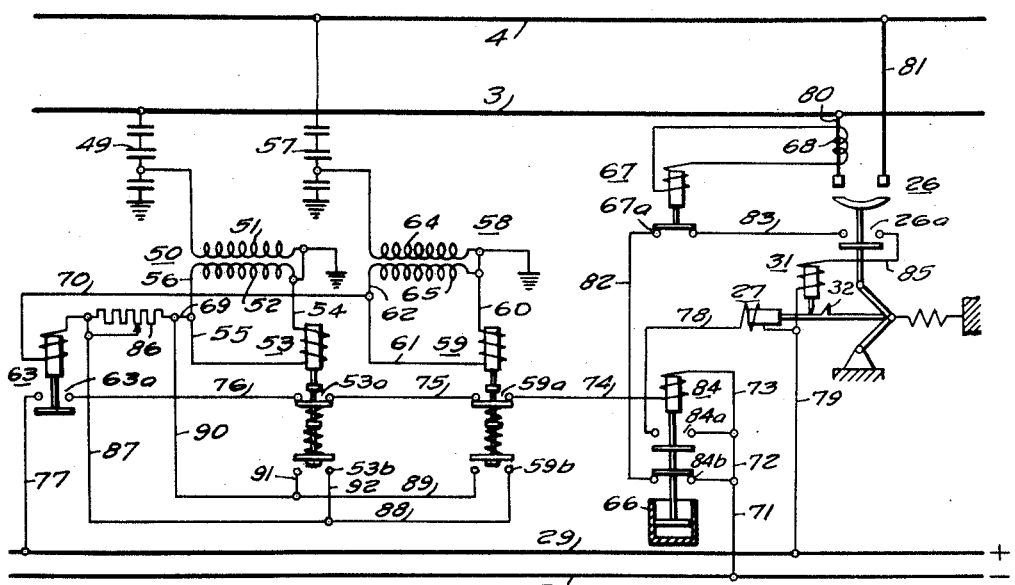

Fig. 4 is a diagrammatic view of a modification of Fig. 2 in which our control system functions to parallel the trolleys either while the voltage differential between the trolleys exceeds a preselected maximum or the absolute voltage of any of the trolleys is diminished below a preselected value; and Fig. 5 is a diagrammatic view of a control system embodying our invention for paralleling a pair of trolleys when there are a plurality of crossovers between the trolleys.

Figure 1:
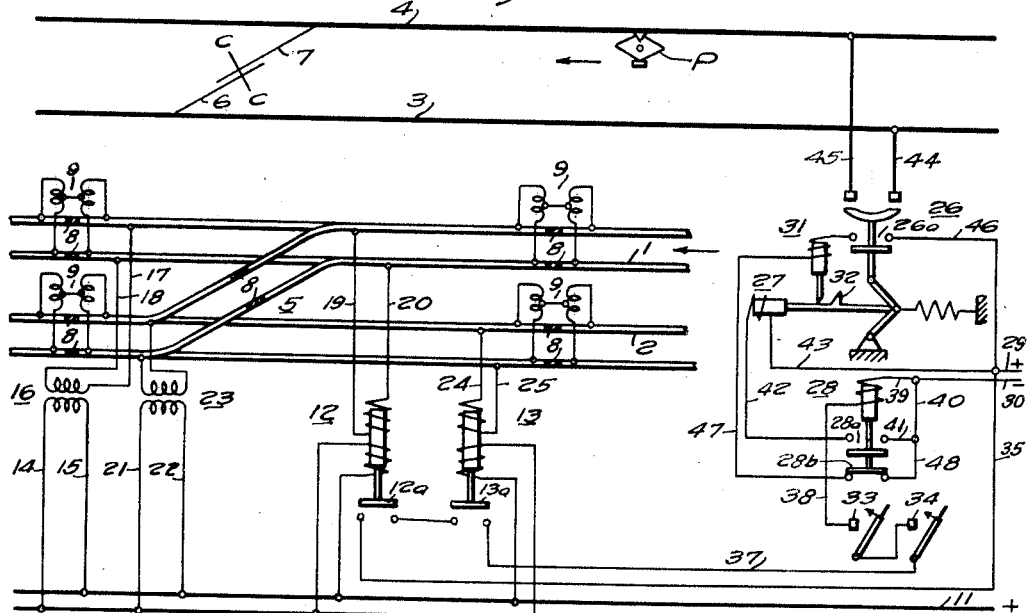
Figure 1 is a diagrammatic view of a preferred embodiment of our control system, the function of which is to parallel trolleys of adjacent tracks when a train is to be passed from one of the tracks to the other along a crossover.

Referring now to Figure 1, the numerals 1 and 2 designate adjacent vehicle tracks which are supplied with power from trolleys 3 and 4, respectively. A crossover between tracks 1 and 2 is shown at 5, and the trolley system for feeding this crossover may consist of stub trolleys 6 and 7 which extend from the main trolleys 3 and 4, respectively, along the crossover track 5. These stub trolleys may terminate approximately midway along the crossover and may overlap each other for a preselected length in order that the current collecting device of the locomotive will have an uninterrupted power supply along the crossover 5.

On either side of the crossover 5, break sections or insulated joints 8 are provided in the tracks 1 and 2 and similar insulated joints are provided also in the crossover 5. In accordance with our invention, the sections of the tracks 1 and 2 between these insulated joints 8 are used as current conductors in the control circuits of our system and will be explained in more detail hereinafter.

When our invention is utilized with a trolley system of the type shown, in which current is collected from the trolleys 3 and 4 by any suitable current collecting device such as a pantograph P, the return current being carried through the track circuit, we prefer to use bonding transformers 9, such transformers each having one winding thereof connected on each side of the insulated track joint 8. These transformers are so designed that they will pass the return trolley current through the track rails and which divides equally in the two rails, but will not pass the current from supply conductors 10 and 11 utilized in our control system which flows in opposite directions in the two rails.

In our invention, we also employ a pair of double winding track relays 12 and 13. Each of these relays has two windings, which will be referred to as upper and lower windings, the lower winding of each being energized directly from conductors 10 and 11, and the upper winding of each being energized indirectly from the conductors 10 and 11 and transformers 16 and 23 through their respective track circuits.

The circuit established for energizing the upper winding of relay 12 may be traced from conductors 10 and 11 through conductors 14 and 15, transformer 16, conductors 17 and 18, the rails of track 1, and conductors 19 and 20, to the upper winding.

Likewise, the circuit established for energizing the upper winding of relay 13 may be traced from conductors 10 and 11 through conductors 21 and 22, transformer 23, the rails of track 2 and conductors 24 and 25 to the said winding.

Relays 12 and 13 are so designed that they will operate only when both upper and lower windings are simultaneously energized and their function will be explained in further detail hereinafter.

To provide for connecting the trolleys 3 and 4 together in parallel circuit relation, we prefer to use a circuit breaker 26 which may be of any well known type, the particular one illustrated being provided with a closing solenoid 27, and a relay 28 for supplying power from any suitable external source, such as conductors 29 and 30 to the winding of the solenoid 27 through its contacts 28a. For opening the circuit breaker 26, a trip solenoid 31 is utilized, and is energized from conductors 29 and 30 in accordance with the closing of relay contacts 28b.

Solenoid 31, when energized, pulls its armature upwardly and disengages latch member 32, allowing the contacts of circuit breaker 26 to move to its spring biased open position.

The mechanical switching apparatus utilized to throw the track switches at the crossover between tracks 1 and 2 is not shown as it forms no part of our invention, however, auxiliary electrical contacts on such switching apparatus are indicated at 33 and 34. These contacts close when the aforesaid track switches are thrown to permit a train to cross over between tracks 1 and 2 and are utilized in our system to prevent the circuit breaker 26 from closing when trains are merely passing each other on tracks 1 and 2 in the section of the tracks between insulated track joints 8.

In order that a better understanding of our invention may be attained, a detailed description of its operation follows. Let us assume, for example, that a train, the pantograph on the locomotive being shown at P, is proceeding on track 1 in the direction of the arrow and it is desired to transfer it from track 1 to track 2 along the crossover 5.

The track switches are set accordingly and auxiliary contacts 33 and 34 close. As the first axle of the locomotive (if the locomotive is at the head of the train) crosses the insulated section 8 of track 1, the upper winding of relay 12, which is energized through the rails of track 1 as hereinbefore described, will now be shunted out by the axle of the locomotive and will cause the armature of relay 12 to drop out and close its contacts 12a.

As the locomotive proceeds along track 1 and enters crossover 5, the first axle of the locomotive to pass beyond the insulated section 8 of the crossover will likewise shunt out the upper winding of relay 13, causing its armature to drop out and close relay contacts 13a.

With both relay contacts 12a and 13a closed, and auxiliary switch contacts 33 and 34 likewise closed, a circuit will be established for energizing the winding of relay 28 from supply conductors 29 and 30, which extends from conductor 29 through conductor 35, relay contacts 12a and 13a, and intermediate conductor 36, conductor 37, switch contacts 34 and 33, conductor 38, winding of relay 28, and conductor 39 to conductor 30.

With the winding of relay 28 thus energized, relay contacts 28a will close and 28b will open. Closure of contacts 28a establishes a circuit for energizing the closing solenoid 27 of circuit breaker 26 from conductors 29 and 30, which extends from conductor 30 through conductors 40 and 41, relay contacts 28a, conductor 42, winding of solenoid 27, and conductor 43 to the other supply conductor 29.

When the closing solenoid 27 is energized, the contacts of circuit breaker 26 will move to a closed position and place trolley conductors 3 and 4 in parallel operation.

It will be understood that the current collecting device or pantograph P, as illustrated in Fig. 1, is usually located between the extreme front and rear axles of the locomotive. Hence, we prefer to place the insulated section 8 in crossover 5 at approximately the position indicated by the line c—c on the stub trolleys 6 and 7, so that the breaker 26 will be energized in ample time to parallel trolleys 3 and 4 before the pantograph of the locomotive leaves stub trolley 7.

When the last axle of the final car in the train passes beyond the insulated break section 8 in crossover 5, it will be apparent that the shunt on the upper winding of relay 12 will be removed, and cause relay 12 to operate and open its contacts 12a. With relay contacts 12a open, relay 28 will then become deenergized and close its contacts 28b, which will obviously establish a circuit from conductors 29 and 30 to operate the trip solenoid 31, causing the breaker 26 to move to its open position and interrupt the parallel connection between trolley conductors 3 and 4 through conductors 44 and 45. The energizing circuit for trip solenoid 31 extends from conductor 29 through conductor 46, closed auxiliary breaker contacts 26a, winding of solenoid 31, conductor 47, relay contacts 28b, and conductors 48 and 40 to the other supply conductor 30.

The trolley conductors 3 and 4 will now remain in operation separately until another crossover is desired to be made. It will be understood that our invention will operate equally as well when a train is passed from track 2 to track 1, the only difference in operation being that relays 12 and 13 drop out in the reverse order. Also, since our device to parallel the trolleys is responsive to the bridging of the rails comprising tracks 1 and 2 by the axles of the cars in the train, it will likewise be apparent that the position of the locomotive with respect to the remainder of the train is immaterial. Also, the number of raised pantographs per train is immaterial.

Figure 2:
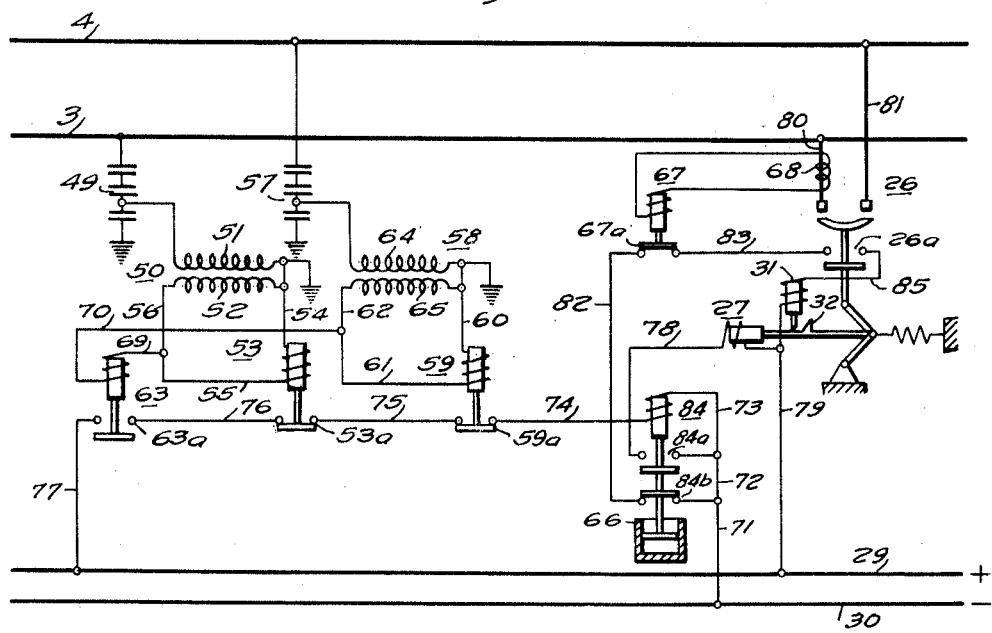
Fig. 2 is a diagrammatic view of a control system embodying our invention for paralleling a pair of trolleys while the voltage differential between the two trolleys exceeds a preselected maximum.

Referring now to Fig. 2, which illustrates a preferred embodiment of the invention, operable to connect trolley conductors for parallel operation during such time as the voltage differential between them exceeds a preselected maximum, as in Fig. 1, the numerals 3 and 4 indicate trolleys feeding adjacent tracks or any two tracks on which it is desired to install the system, and the circuit breaker for paralleling the trolleys is indicated at 26.

To obtain an indicia of the voltage on trolley 3, a coupling capacitor 49 may be used, the terminals thereof being connected to trolley conductor 3 and ground respectively. A transformer 50 may also be utilized and the terminals of its primary winding 51 connected to ground and to any suitable tap on the coupling capacitor 49 respectively. The winding of a control relay 53 is connected to the terminals of the secondary winding 52 through conductors 54, 55 and 56. If desirable, the coupling capacitor alone may be used or the more conventional potential transformer may be used in place of capacitor 49 and transformer 50.

Likewise to obtain an indicia of voltage on trolley conductor 4, coupling capacitor 57 and transformer 58 are similarly connected to another control relay 59. The primary winding 64 of transformer 58 is connected to ground and secondary winding 65 thereof is connected to relay 59 through conductors 60, 61 and 62.

A third relay 63 is also utilized and is connected to secondaries 65 and 52 to be responsive to the differential in voltage between the trolley conductors 3 and 4. Relay 63 is so designed that it will operate when the voltage impressed upon its winding is indicative of a voltage differential between trolleys 3 and 4 which is in excess of the preselected allowable maximum.

To establish a circuit for energizing the closing solenoid 27 of circuit breaker 26, a relay 64, preferably of a retarded or slow acting type, is utilized, and its energizing coil is connected to supply conductors 29 and 30 through the contacts of relays 53, 59 and 63.

A cut-off relay 67 is also employed and its operating coil is connected to a current transformer 68 which is inserted in the connecting circuit between the trolleys 3 and 4. The function of this relay will be described hereinafter.

When the power demand from trolleys 3 and 4 at any particular instant of time is such that a differential in voltage exists between these two trolleys which exceeds the preselected maximum value for which the system has been set to operate, the winding of relay 63 which is connected to the secondaries 52 and 65 of transformers 50 and 58, respectively, through conductors 69 and 70 will be subjected to a voltage which is sufficient to cause it to operate and close its contacts 63a.

Relays 53 and 59, which are energized from secondary windings 52 and 65, respectively, of transformers 50 and 58 will also now be closed, and a circuit will be established for energizing the winding of relay 64 from the auxiliary supply conductors, which extends from conductor 30, through conductors 71, 72 and 73, the energizing coil of relay 64, conductor 74, relay contacts 59a, conductor 75, relay contacts 53a, conductor 76, relay contacts 63a and conductor 77 to the other supply conductor 29.

When relay 64 has been energized for a period long enough to overcome the retarding action effected by its dashpot 66, its contacts 64a will close and cause the winding of the closing solenoid 27 of circuit breaker 26 to be energized from the auxiliary supply conductors 29 and 30. This circuit extends from conductor 30 through conductors 71 and 72, relay contacts 64a, conductor 78, winding of solenoid 27 and conductor 79 to conductor 29.

It will be apparent that when the closing solenoid 27 is thus energized, circuit breaker 26 will close and place trolleys 3 and 4 in parallel operation through the conductors 80 and 81.

Trolleys 3 and 4, in accordance with our invention will remain in parallel operation, while load conditions exist such that undesirable voltage conditions would exist on the trolley system, were the trolleys to be operated separately. With trolleys 3 and 4 operating in parallel, a circulating current will flow between them which will be proportional to the voltage differential between the two trolleys prior to paralleling and inversely proportional to the impedance of the trolleys measured across the open breaker with all system electromotive forces short circuited.

Relay 67 is so designed that while the circulating current between trolleys 3 and 4 exceeds a preselected maximum corresponding to the maximum voltage difference to be allowed for independent trolley operation, the potential impressed on the winding thereof derived from current transformer 68 will be sufficient to cause the relay to maintain its contacts 67a in an open position.

It will be apparent to those experienced in this art that operation of trolleys 3 and 4 in parallel will cause the power requirements from both trolleys to be divided between them, thereby improving the voltage of the trolley which is more heavily loaded. When the load condition has been improved to the extent where the differential in voltage, which would occur between the trolleys, were they separately operated, is below the preselected value for which the control system has been set, the circulating current flowing between trolleys 3 and 4 will have obviously also decreased. Such decrease in current flowing through current transformer 68 will lower the current in the winding of relay 67, causing this relay to drop out and close its contacts 67a. At such time relay 63 will also be dropped out and cause relay 84 to be deenergized, thereby closing the circuit for energizing the winding of trip solenoid 31 from supply conductors 29 and 30. Such circuit may be traced from conductor 30 through conductor 71, relay contacts 84b, conductor 82, relay contacts 67a, conductor 83 and closed breaker auxiliary contacts 26a, conductor 85, winding of trip relay 31 and conductor 79 to the other supply conductor 29. When trip solenoid 31 operates, the breaker 26 will be unlatched and move to its open position.

In this embodiment of the invention, relay 84 is preferably of the time-delay type so that the trolleys 3 and 4 will not be placed in parallel until the required voltage differential for paralleling has existed for a predetermined period of time, such period obviously being dependent upon the time characteristic of relay 84.

Likewise, it will be noted that contacts 53a and 59a of relays 53 and 59, respectively, have been placed in series arrangement with contacts 63a of relay 63, this latter relay, as hereinbefore explained, being responsive to the voltage differential between trolleys 3 and 4, and being operative to initiate a closure of the circuit breaker 26.

While it is preferred to include the contacts of relays 53 and 59 in the circuit so that the trolleys will not be paralleled should either one of them be taken out of service by disconnecting their power supply, or in the event that a line fault produces a condition of low voltage on either one of the trolleys which is below the normal range of operating voltage, it will be understood that the principles of our invention do not necessarily require such inclusion of these relays.

Figure 3:
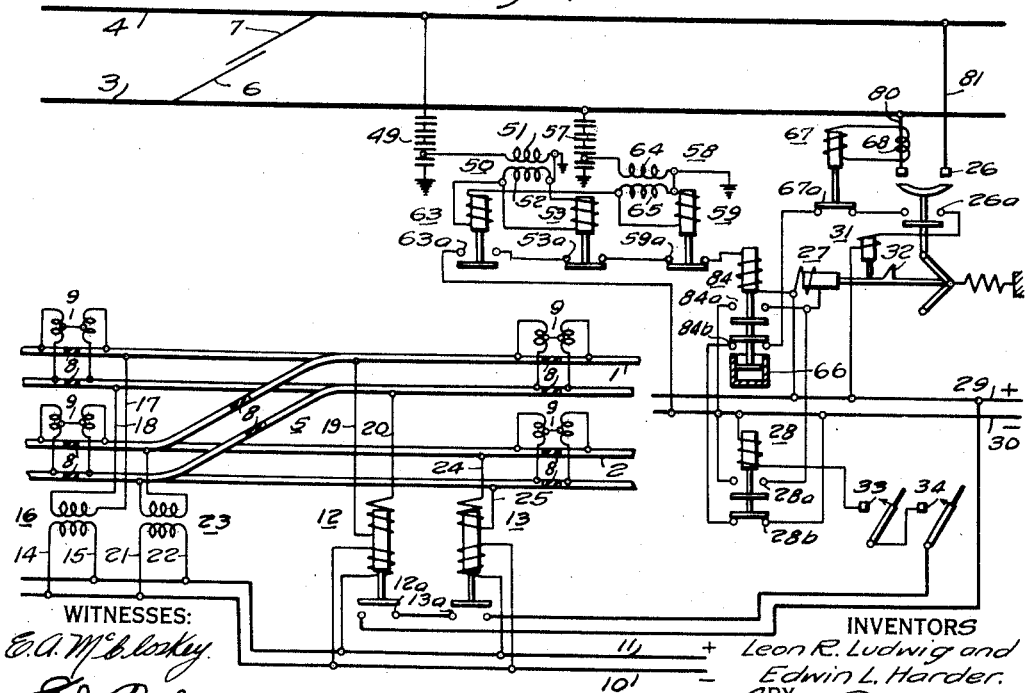
Fig. 3 is a diagrammatic view of a preferred embodiment of our control system for paralleling a pair of trolleys either when the current collector device of a locomotive is making a crossover between the trolleys or while the voltage differential between the trolleys exceeds a preselected maximum.

Referring now to Fig. 3 which illustrates a system to provide for paralleling adjacent trolleys either while a train is crossing over between tracks fed by these trolleys, or during the time that a voltage differential exceeding a preselected maximum exists between the trolleys, the same reference numerals have been used to designate those elements common to the systems of Figs. 1 and 2.

As hereinbefore explained with respect to the operation of the device in Fig. 1, when a train is passing from track 1 to track 2, relays 12 and 13 will drop out in accordance with train movement along track 1 and cross over track 5, thereby establishing a circuit for energizing relay 28 from auxiliary supply conductors 29 and 30. When relay 28 operates, the closing solenoid 27 of circuit breaker 26 is energized from supply conductors 29 and 30, and the trolleys 3 and 4 are placed in parallel operation. After the train has completed the crossover, the circuit breaker 26 will be tripped out.

Likewise, as explained in reference to Fig. 2, when the voltage differential between trolleys 3 and 4 exceeds a preselected maximum value, relay 63 will operate and set up a circuit from supply conductors 29 and 30 for energizing the coil of relay 84. With relay 84 thus energized, its contacts 84a will subsequently close and energize the closing coil 27, thereby effecting a closure of the breaker 26 and tieing trolleys 3 and 4 together in parallel. As heretofore explained, the breaker will remain closed until the circulating current between the trolleys 3 and 4 is reduced to a predetermined amount whereupon trip solenoid 31 will be energized and the circuit breaker opened.

It will be noted that in the system of Fig. 3, the circuit which is established from the auxiliary supply conductors 29 and 30 to energize the trip relay 31, is carried back through relay contacts 84b and 28b in series arrangement, and it will be apparent that both relays 84 and 28 must be deenergized and relay contacts 84b and 28b closed before the winding of trip solenoid 31 can be energized.

Thus when a train has completed a crossover between tracks 1 and 2, and relay 28 has been dropped out, trip solenoid 31 will be operated only when relay 84 is also in deenergized position, the open position of relay 84 indicating a differential in unparalleled voltage between trolleys 3 and 4 which is less than the selected maximum which is to be allowable for independent operation of each trolley.

Conversely, when trolleys 3 and 4 are placed in parallel operation because the particular instant power demands on the trolleys cause the allowable maximum preselected voltage differential to be exceeded, and subsequently the loading of the two trolleys changes to permit relays 67 and 84 to drop out, the trip solenoid 31 will operate only when relay 28 is also in open position indicating that no train is crossing between tracks 1 and 2 at such time.

Referring now to Fig. 4, which is a modification of the control system shown in Fig. 2, this system provides for paralleling the trolleys 3 and 4, not only when the voltage differential between the trolleys has exceeded the preselected maximum allowable for independent trolley operation, but also when the operating voltage of either of the trolleys has been reduced below a preselected absolute value.

If both of the trolleys are heavily loaded resulting in a considerable reduction in the operating voltage on each trolley, the differential between the respective voltages of the two trolleys may not be sufficient to cause relay 63 to operate and initiate a closure of the tie breaker 26. In order that relay 63 will operate to close the circuit breaker 26 when the absolute voltage of either trolley 3 or 4 has been reduced below a preselected minimum value, there is provided a sensitizing resistor 86 which is connected in the circuit of the differential relay 63.

Should the absolute voltage of trolley 3 diminish below the preselected minimum value, relay contacts 53b will close and connect a shunt across resistor 86 through conductors 90, 91, 92 and 87. The shunt on resistor 86 will allow current through relay 63 to increase sufficiently to close its contacts 63a and set up the circuit for closing the tie breaker 26.

Likewise, should the absolute voltage of trolley 4 diminish sufficiently, relay contacts 59b will close to place a shunt across resistor 86 through conductors 87, 88, 89 and 90 which will also cause relay 63 to close and establish the control circuit for closing breaker 26.

In Fig. 5, which is a modification of the trolley control system shown in Fig. 1, a common tie breaker 26 is utilized to tie trolleys 3 and 4 in parallel in response to train movement between tracks 1 and 2 at any one or more of a plurality of crossover points such as crossovers A and B.

The control system in Fig. 5 operates similarly to that shown in Fig. 1 except that an intermediate relay 95 is utilized in the control apparatus for each crossover to establish a circuit over pilot conductors 93 and 94 for energizing relay 28 which functions to initiate a closing operation of tie breaker 26.

Should a train pass from track 1 to track 2 at crossover A, a circuit will be established from the auxiliary supply conductors 10 and 11 for energizing the winding of relay 95 which may be traced from conductor 11 through conductor 96, relay contacts 12a and 13a and intermediate conductor 97, conductor 98, switch contacts 33 and 34, conductor 99, winding of relay 95 and conductor 100 to supply conductor 10. Relay contacts 95a will now close and set up a circuit for energizing the winding of relay 28 from conductors 10 and 11 over pilot wires 93 and 94, which extends from supply conductor 11 through conductor 101, relay contacts 95a, conductor 102, pilot wire 93, conductor 103, winding of relay 28, conductor 104, pilot wire 94, and conductor 105 to supply conductor 10.

Relay 28 will then operate to initiate a closure of tie breaker 26 as heretofore explained in connection with the operation of the system shown in Fig. 1.

Likewise, should a train pass from track 1 to track 2 at crossover B, relay 95 will close and also establish a circuit from supply conductors 10 and 11 over pilot wires 93 and 94 for energizing the winding of relay 28 to initiate a closing operation of tie breaker 26 and parallel trolleys 3 and 4.

For purposes of convenience, we have illustrated the principles of our invention as applied to a pair of tracks only. However, it will be apparent that our control system may be also applied to any number of tracks on the right-of-way. For example, were there four tracks containing crossovers between adjacent tracks, a control system such as shown in Figs. 1, 3 or 5 could be connected between each of the tracks, in which case three of such control systems would be required, one each between tracks 1 and 2, 2 and 3, and 3 and 4, respectively.

It will likewise be apparent that the principles of our invention embodied in the control system shown in Figs. 2 and 4 can be applied to all of the trolleys in the trolley system or to any two or more particular trolleys in such system.

Still other modifications may be made in the embodiments illustrated without departing from the spirit and scope of our invention and we desire, therefore, that only such limitations as are necessitated by the prior art be placed upon the appended claims.

We claim as our invention:

1. The combination in an electric railway track system comprising, a plurality of railway tracks and a trolley for supplying power to electric vehicles associated with each track, of a circuit breaker operable to connect two of the trolleys together, said circuit breaker being normally in its open position so that the trolleys function independently of one another, and control means functioning automatically in response to certain predetermined conditions of said system for effecting the closure of said circuit breaker.

2. The combination in an electric railway track system comprising, a plurality of railway tracks and a trolley for supplying power to electric vehicles associated with each track, of a circuit breaker operable to connect two of the trolleys together, said circuit breaker being normally in its open position so that the trolleys function independently of one another, control relay means operable in response to certain predetermined conditions of said system, and a relay controlled thereby for effecting the closure of the circuit breaker.

3. In an electric railway multiple track system including a normally independently operated trolley for each track thereof, track crossovers between adjacent tracks, and branch trolleys leading from adjacent trolleys to feed said crossovers, the combination comprising, a tie breaker for each pair of adjacent tracks including a crossover therebetween, and track relay means for closing one or more of said tie breakers to parallel adjacent trolleys when a train is passing from one track to another track in said track system along said crossovers.

4. In an electric railway track system including a pair of tracks with a crossover therebetween, track switching means, a separate main trolley for each track and a branch trolley leading from each of said main trolleys along said crossover, a control system therefor comprising, a tie breaker, a track relay for each track operable when train equipment reaches a predetermined position on said tracks, and means responsive to the combined operation of said track relays and said track switching means for closing said tie breaker for paralleling said main and branch trolleys while said train is passing from one to the other of said pair of tracks along said crossover.

5. In a railway track system including a pair of tracks, a crossover between said tracks provided with an insulated track section in said crossover, track switching means for said crossover, a main trolley for each of said tracks and a branch trolley leading from each of said main trolleys along said crossover and extending beyond said insulated track section, the combination comprising, a tie breaker, relay means operable when train equipment bridges said insulated section in said crossover, and means responsive to the operation of said track switching means and said relay means for actuating said breaker to a closed position to parallel said main and branch trolleys.

6. In an electric railway track system including a pair of tracks, a main trolley for each of said tracks, means for energizing said trolleys for normally independent operation, a track crossover between said tracks and a branch trolley leading from each of said main trolleys to feed said crossover, the combination comprising, a trolley tie breaker for temporarily connecting said main and branch trolleys for parallel operation when a train is crossing over from one to the other of said tracks, and track relay means for controlling the closing and opening operations of said tie breaker.

7. In combination with a pair of tracks, a crossover between said tracks, an insulated section in said crossover, a main trolley for each of said tracks and a branch trolley leading from each of said main trolleys along said crossover, means for temporarily paralleling said trolleys when a train is passed between said tracks along said crossover comprising a circuit breaker, a double winding track relay for each of said tracks, each of said track relays having one winding thereof continuously energized from a supply source and one winding thereof energized from said source through its respective track and being operable when both of said windings are energized, means actuated in response to movement of a train along said crossover and bridging said insulated section for deenergizing one winding of each of said relays, whereby both of said relays are rendered inoperable, and means responsive to the inoperable position of both of said relays for closing said circuit breaker to parallel said trolleys, said means including tripping means for opening said breaker when said train has passed beyond said insulated section of said crossover.

8. In an electric railway track system including a pair of tracks, a plurality of track crossovers therebetween, a break section in each of said crossovers, track switching means for each of said crossovers, a separate main trolley for each of said tracks and branch trolleys leading from each of said main trolleys to feed said crossovers, the combination comprising, a trolley tie breaker, track relays for each of said crossovers operable when a train bridges the break section of any of said crossovers, means responsive to the combined operation of track switching means and track relays at any one of said crossovers for actuating said breaker to a closed position to parallel said main trolleys and said branch trolleys, and means for opening said breaker when the last axle in said train has passed over said break section in said crossover.

9. In a trolley system, the combination of a plurality of trolleys, means for energizing said trolleys for normally independent operation, and means responsive to a predetermined voltage differential between any pair of said trolleys at any selected point on said trolley system for placing said pair of trolleys in parallel operation.

10. In a trolley system, the combination of a pair of trolleys, means for energizing said trolleys for normally independent operation, and means responsive either to a condition of predetermined voltage differential for a preselected time interval between said trolleys or to a preselected condition of absolute voltage on either of said trolleys at any point on said system for placing said trolleys in parallel operation.

11. In a trolley system, the combination of a plurality of trolleys, means for energizing each of said trolleys for normally independent operation, means responsive to a predetermined voltage differential between two or more of said trolleys at any point on said system for placing said trolleys in parallel operation and including means responsive to a predetermined recovery voltage between said trolleys for taking said trolleys out of said parallel operation.

12. In a trolley system for electric railway apparatus including a plurality of trolleys and trolley energizing means, the combination with any pair of trolleys, of control means for each trolley in said pair of trolleys operable in response to the respective line voltages thereof, control means operable in response to a predetermined voltage differential between said pair of trolleys at any selected point on said system, and means responsive to the combined operation of said control means or to a condition of preselected absolute voltage on either of said pair of trolleys for placing said pair of trolleys in parallel operation.

13. In a trolley system for electric railway apparatus comprising, a plurality of trolleys and trolley energizing means, the combination with any pair of trolleys, of control means for each trolley in said pair of trolleys operable in response to the respective line voltages thereof, control means operable in response to a predetermined voltage differential between said pair of trolleys at any selected point on said system, and means responsive to the combined operation of said control means for placing said pair of trolleys in parallel operation, said means being operable in response to a predetermined recovery voltage between said pair of trolleys for taking said trolleys out of parallel operation.

14. In a trolley system for electric railway apparatus including a plurality of trolleys and means for energizing said trolleys for normally independent operation, the combination with a pair of said trolleys, of means for connecting said pair of trolleys for temporary parallel operation comprising a tie circuit breaker for said pair of trolleys, a control relay for each trolley in said pair of trolleys including energizing means therefor, responsive to the respective line voltages thereof, a control relay including energizing means therefor responsive to a predetermined trolley voltage differential between said pair of trolleys at any selected point on said trolleys, means operable when all of said control relays are energized for closing said tie circuit breaker, and means operable in response to a predetermined recovery voltage between said pair of trolleys for opening said tie breaker.

15. In a trolley system for electric railway apparatus including a plurality of trolleys and trolley energizing means, the combination with any pair of trolleys, of means for placing said pair of trolleys in parallel operation comprising, a tie circuit breaker for paralleling said pair of trolleys, a control relay for each trolley in said pair of trolleys actuated in response to the respective line voltages thereof, a control relay actuated in response to a predetermined differential in voltage between said pair of trolleys at a selected point on said system, a time-delay relay for timing the duration of said voltage differential, and means operable when said control relays and said time-delay relay are actuated for closing said tie circuit breaker.

16. The combination with electric railway apparatus including a pair of tracks, a main trolley for each of said tracks, a crossover, and a branch trolley leading from each of said main trolleys along said crossover, of means for paralleling said trolleys either when a train moves along said crossover from one of said pair of tracks to the other or in response to a predetermined voltage differential existing between said trolleys.

17. The combination with electric railway apparatus including a pair of tracks, a crossover for said tracks, a main trolley for each of said tracks, and a branch trolley leading from each of said main trolleys along said track crossover, of means for paralleling said trolleys either in response to train movement along said crossover from one of said pair of tracks to the other or in response to a condition of a predetermined voltage differential existing between said trolleys, said means including means for taking said trolleys out of parallel operation upon the completion of said train crossover movement under predetermined conditions of recovery voltage between said trolleys.

18. The combination with electric railway apparatus including a pair of tracks, a track crossover, a break section in said crossover, switch operating means for said crossover, a main trolley for each of said tracks, and a branch trolley leading from each of said main trolleys along said crossover, of means for paralleling said trolleys either in response to train movement along said crossover from one of said pair of tracks to the other, or in response to a predetermined differential in voltage existing between said trolleys comprising, a tie circuit breaker between said trolleys, a double winding track relay for each of said tracks, each of said relays having one winding thereof directly energized from a power source and the other winding thereof energized indirectly from said source through its respective track and being operable when both of said windings are energized, said relays being rendered inoperable when a train bridges said break section in said crossover, a control relay for each of said trolleys energized in response to the respective line voltages thereof, a control relay energized in response to a predetermined voltage differential between said trolleys at any preselected point on said trolleys, and means operable when all of said control relays are energized or when both of said track relays are in an inoperative position in cooperation with said switch operating means for closing said tie breaker.

19. The combination with electric railway apparatus including a pair of tracks, a crossover, a break section in said crossover, track switch operating means for said crossover, a main trolley for each of said tracks, and a branch trolley leading from each of said main trolleys along said crossover, of means for paralleling said trolleys either in response to train movement along said crossover from one of said pair of tracks to the other, or in response to a predetermined differential in voltage existing between said trolleys for a predetermined interval of time comprising, a tie circuit breaker between said trolleys, a double winding track relay for each of said tracks, each of said relays having one winding thereof directly connected to a power source for energization thereof, and the other winding thereof connected to said source through its respective track whereby said track windings are shunted when train axles bridge said break section in said crossover for deenergizing said track winding of each of said track relays whereby both of said relays are rendered inoperative, a control relay for each of said trolleys energized in response to the respective line voltages thereof, a control relay energized in response to a predetermined voltage differential between said trolleys at any selected point on said trolley, a time-delay relay for timing the duration of said voltage differential, means operable when all of said control relays are energized in cooperation with the operation of said time-delay relay or when both of said track relays are in an inoperative position for closing said tie breaker, and means for opening said tie breaker to take said trolleys out of parallel operation upon the completion of said train crossover movement under predetermined conditions of recovery voltage between said trolleys.

LEON R. LUDWIG.
EDWIN L. HARDER.